United States Patent [19]

Kikuchi et al.

[11] Patent Number: 5,190,691

[45] Date of Patent: Mar. 2, 1993

[54] FERROELECTRIC LIQUID CRYSTAL COMPOSITION

[75] Inventors: Makoto Kikuchi, Kisarazu; Fusayuki Takeshita, Ichihara; Mitsuyoshi Ichihashi, Fukuoka; Kanetsugu Terashima, Ichihara; Kenji Furukawa, Yokosuka, all of Japan

[73] Assignee: Chisso Corporation, Tokyo, Japan

[21] Appl. No.: 388,500

[22] Filed: Aug. 2, 1989

[30] Foreign Application Priority Data

Aug. 3, 1988 [JP] Japan .................. 63-192663

[51] Int. Cl.$^5$ .............. C09K 19/34; C09K 19/12; C09K 19/20; G02F 1/13
[52] U.S. Cl. .................. 252/299.61; 252/299.66; 252/299.67; 359/104
[58] Field of Search ............. 252/299.61, 299.66, 252/299.67

[56] References Cited

U.S. PATENT DOCUMENTS

| | | | |
|---|---|---|---|
| 4,596,667 | 6/1986 | Inukai et al. | 252/299 |
| 4,765,924 | 8/1988 | Inoue et al. | 252/299 |
| 4,780,242 | 10/1988 | Miyazawa et al. | 252/299 |
| 4,820,444 | 4/1989 | Inukai et al. | 252/299 |
| 4,826,621 | 5/1989 | Terashima et al. | 252/299.61 |
| 4,834,907 | 5/1989 | Inoue et al. | 252/299 |
| 4,871,472 | 10/1989 | Krause et al. | 252/299.65 |
| 4,882,083 | 11/1989 | Terashima et al. | 252/299.61 |
| 4,911,863 | 3/1990 | Sage et al. | 252/299.65 |
| 4,931,208 | 6/1990 | Furukawa et al | 252/299.61 |
| 4,961,875 | 10/1990 | Ohno et al. | 252/299.66 |
| 4,966,727 | 10/1990 | Ichihashi et al. | 252/299.61 |
| 4,973,426 | 11/1990 | Ohno et al. | 252/299.66 |

FOREIGN PATENT DOCUMENTS

| | | |
|---|---|---|
| 0178647 | 10/1985 | European Pat. Off. . |
| 0206228 | 6/1986 | European Pat. Off. . |
| 0267585 | 5/1988 | European Pat. Off. . |
| 0298702 | 7/1988 | European Pat. Off. . |
| 0315455 | 11/1988 | European Pat. Off. . |
| 0318028 | 11/1988 | European Pat. Off. . |
| 62-22889 | 1/1987 | Japan . |
| 2022889 | 1/1987 | Japan ............. 252/299.61 |
| 63-267763 | 11/1988 | Japan . |

Primary Examiner—Robert L. Stoll
Assistant Examiner—C. Harris
Attorney, Agent, or Firm—Leydig, Voit & Mayer

[57] ABSTRACT

The present invention provides a ferroelectric liquid crystal composition wherein the phase transition series of the composition assumes an order of isotropic liquid→cholesteric phase→chiral smectic C phase starting from the high temperature and to a switching element good in contrast, and memory properties using the same. The composition comprises a composition that contains a component A of a compound having the formula:

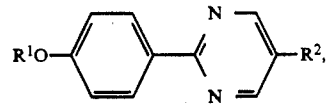

and/or a compound having the formula:

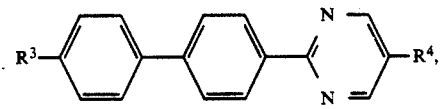

wherin $R^1$ and $R^2$ represent each an alkyl group having 1 to 18 carbon atoms;
a component B of a compound of the formula:

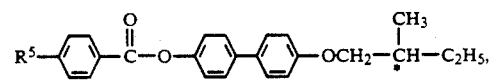

a component C of a compound of the formula:

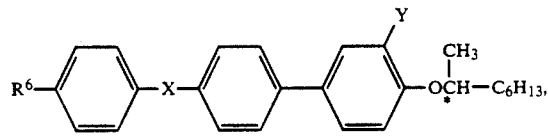

and
a component D of a compound of the formula:

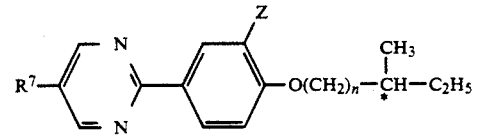

wherein $R^3$, $R^4$, $R^5$, $R^7$, and $R^8$ represent each an alkyl group or alkoxy group having 1 to 18 carbon atoms, x represents

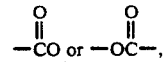

Y and Z represent each a hydrogen atom, or a halogen atom, n is an integer of 0 to 10, and * indicates an asymmetric carbon atom; and
with the proportion of said component A being 20 to 80 wt. %, that of the component B being 5 to 30 wt. %, that of said component C being 3 to 10 wt. %, and that of said component D being 3 to 20 wt. %, based on the total amount of said four components A, B, C and D.

12 Claims, No Drawings

FERROELECTRIC LIQUID CRYSTAL COMPOSITION

BACKGROUND OF THE INVENTION

1. Field of the Prior Art

The present invention relates to ferroelectric liquid crystal compositions. More particularly, the present invention relates to ferroelectric liquid crystal compositions having a quick response property wherein the phase transition series assumes an isotropic liquid→a cholesteric phase→a chiral smectic C phase in the named order from the high temperature side without assuming a smectic phase, and to switching elements using the same.

2. Description of the Prior Art

Liquid crystal compounds are widely used as materials in display elements, and most of these liquid crystal elements are of the TN type display system, and the liquid crystal materials are in the nematic phase.

The TN type display system has advantages such as moderated eye fatigue and extremely small consumption of electric power because of being a non-emissive type, whereas it has disadvantages such as slow response and disappearance of display at certain visual angles.

In recent years, this system is being improved in such ways as to keep the characteristics of flat displays, and particularly, a faster response and the enlargement of the visual angle are demanded.

In order to meet these demands, improvements in liquid crystal materials have been attempted. However, as compared with other emissive type displays (e.g., electroluminescence displays and plasma displays, it is apparent that the TN type display has a much slower response time and has a smaller visual angle.

In order that characteristics of the liquid display element such as features of the non-emissive type and small consumption of electric power may be maintained and in order that a quick response corresponding to that of the emissive type displays may be assured, it is essential to develop a novel liquid display system in place of the TN type display system.

In one of such attempts, a display system in which the optical switching phenomenon of ferroelectric liquid crystals is utilized has been suggested by N.A. Clark and S. T. Lagewall (see *Appl. Phys. Lett.*, 36, p 899, 1980).

The presence of the ferroelectric liquid crystals was announced for the first time in 1975 by R. B. Mayer et al. (see *J. Phys.*, 36, p 69, 1975), and from the view of structure, these crystals belong to the chiral smectic C phase, the chiral smectic I phase, the chiral smectic F phase, the chiral smectic G phase, and the chiral smectic H phase (hereinafter referred to simply as "$S_C^*$", "$S_I^*$", "$S_F^*$", "$S_G^*$", and "$S_H^*$", respectively).

In the chiral smectic phase, molecules are in layers and inclined with respect to the surface of the layer, and the helical axis is vertical to this layer surface.

In the chiral smectic phase, spontaneous polarization takes place, and therefore, when a DC electric field is applied to these layers in parallel with the layers, the molecules turn around the helical axis in accordance with its polarity. The display element of ferroelectric liquid crystals utilizes this switching phenomenon.

Nowadays, of the chiral smectic phases, much attention is particularly paid to the $S_C^*$ phase.

The display system in which switching phenomenon of the $S_C^*$ phase is utilized can be further classified into two types: a birefringence type system using two polarizers and a guest/host type system using a dichroic dye.

Features of these display systems are:
(1) Response time is very short.
(2) Memory properties are present.
(3) Display performance is not affected by the visual angle.

Thus, the display systems have the possibility of achieving the high-density display and is considered to be effectively utilizable in display elements. However, also in these display systems, there are many problems to be solved.

The display systems that use the switching phenomenon of the $S_C^*$ phase are accompanied by problems, for example, as follows:
(1) the layers deform into the shape of the letter L (the resulting shape is called the chevron structure), and therefore a zigzag defect is formed;
(2) the molecules adopt a splayed arrangement, and therefore complete memory properties cannot be obtained; and
(3) in order to secure memory properties, it is required to make the thickness of the cell 2 μm or less, but mass production of such a cell is difficult under the present fabrication technique. In particular, the problems under (1) and (2) must be solved for displays utilizing ferroelectric liquid materials as display elements in order to prevent deterioration of display quality.

However, recently, C. Bowry et al. have proposed a new idea to solve the above problems [see Euro Display 87, 33 (1987)].

They state that when a cell to which SiO had been deposited obliquely is used, and as the $S_C^*$ material, use is made of a material whose phase transition series is the $I_{SO} \rightarrow N^* \rightarrow S_C^*$ (wherein $I_{SO}$ stands for an isotropic liquid, and $N^*$ stands for a cholesteric phase), the above structure having the shape of the letter L can be obviated, so that the zigzag defect is hardly recognized. According to their idea, the use of a cell having an obliquely deposited thin film has brought about good memory properties.

Therefore, recently, the study of display elements using ferroelectric liquid crystal materials of this system has become very popular.

However, there are few practical ferroelectric liquid crystal materials having an $I_{SO} \rightarrow N^* \rightarrow S_C^*$ type phase transition series. For example, since ferroelectric liquid crystal compositions for guest/host type display elements disclosed in Japanese Patent Laid-Open Publication No. 22889/1987 that was filed by the present applicants takes on an $I_{SO} \rightarrow N^* \rightarrow S_C^*$ type phase transition series, it can be used in the system proposed by C. Bowry et al.

However, the response time of the ferroelectric liquid crystal compositions disclosed in Japanese Patent Laid-Open Publication No. 22889/1987 is very long (for example in the case of a ferroelectric liquid crystal composition disclosed in Example 4), and is not practical.

Consequently, further improvement in the responsiveness is eagerly demanded.

SUMMARY OF THE INVENTION

A first object of the present invention is to provide a ferroelectric liquid crystal composition having quick response properties that possesses an isotropic liquid → cholesteric phase→chiral smectic C phase type transition, and assumes an $S_C^*$ phase over wide temperature ranges inclusive of room temperature.

A second object of the present invention is to provide an optical switching element excellent in response properties that uses said liquid crystal composition.

According to a first aspect of the present invention, there is provided a ferroelectric liquid crystal composition having quick response properties, characterized in that the ferroelectric liquid crystal composition contains at least each of:

a component A of one or more compounds selected from the group consisting of compounds of the formula (I):

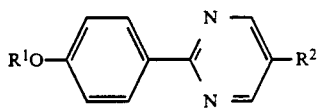

wherein $R^1$ and $R^2$, which may be the same or different, represent each an alkyl group having 1 to 18 carbon atoms;

and compounds of the formula (II):

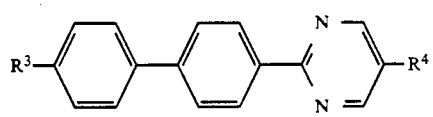

wherein $R^3$ and $R^4$, which may the same or different, represent each an alkyl group or an alkoxy group having 1 to 18 carbon atoms;

a component B of a compound of the formula (III):

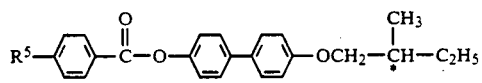

wherein $R^5$ represents an alkyl group or alkoxy group having 1 to 18 carbon atoms, and * indicates an asymmetric carbon atom;

a component C of a compound of the formula (IV):

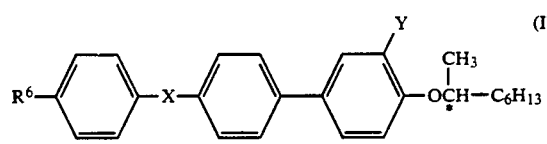

wherein $R^6$ represents an alkyl group or alkoxy group having 1 to 18 carbon atoms, X represents

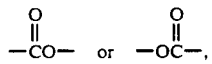

Y represents a hydrogen atom or a halogen atom, and * indicates an asymmetric carbon atom; and a component D of a compound of the formula (V):

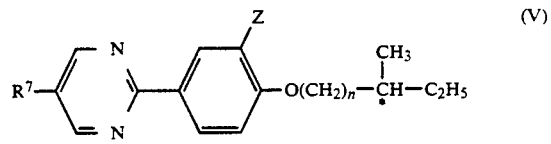

wherein $R^7$ represents an alkyl group or alkoxy group having 1 to 18 carbon atoms, n is an integer of 0 to 10, Z represents a hydrogen taom or a halogen atom, and indicates an asymmetric carbon atom, the proportion of said component A being 20 to 80 wt. %, that of the component B being 5 to 30 wt. %, that of the component C being 3 to 10 wt. %, and that of the component D being 3 to 20 wt. %, preferably the proportion of said component A being 50 to 75 wt. %, that of the component B being 10 to 30 wt. %, that of the component C being 3 to 7 wt. %, and that of the component D being 3 to 20 wt. %, based on the total amount of said four components A, B, C, and D, and the phase transition series assumes an isotropic liquid→a cholesteric phase a chiral smectic C phase in the named order from the high temperature side.

According to a second aspect of the present invention, there is provided a ferroelectric liquid crystal composition, comprising at least the components A, B, C and D defined above and a component E of a compound of the formula (VI):

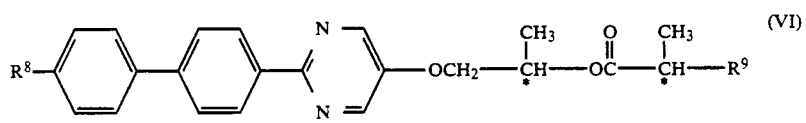

wherein $R^8$ represents an alkyl group or alkoxy group having 1 to 18 carbon atoms, $R^9$ represents an alkyl group having 2 to 18 carbon atoms or an alkoxy group having 1 to 18 carbon atoms, and * indicates an asymmetric carbon atom, with the amount of the component E being 3 to 10 wt. %, based on the total amount of said components A, B, C, and D, and the phase transition series of said composition assumes an order of isotropic liquid→cholesteric phase→chiral smectic C phase, starting from the high temperature side.

In formulae (I) to (VI), the carbon atoms of alkyl groups or alkoxy groups are preferably 6 to 12 in $R^1$ and $R^2$, 4 to 14 in $R^3$ and $R^4$, 5 to 16 in $R^5$, 5 to 12 in R , 6 to 12 in $R^7$, 3 to 7 in $R^8$, 4 to 6 in $R^9$.

According to a third aspect of the present invention, there is provided an optical switching element that uses the ferroelectric liquid crystal composition described in the first or second aspect of the present invention.

DETAILED DESCRIPTION OF THE INVENTION

The compounds represented by the general formulae (I) and (II) that constitute the component A used in the present invention are non-chiral compounds, but they assume a $S_C$ phase, etc., and since they possess very low viscosities, they are very useful in a smectic phase composition as a base. Although the inventors have disclosed their usefulness in Japanese Patent Laid-Open Publication No. 291679/1986, they are also very useful as a component of the ferroelectric liquid crystal composition which the present invention aims at.

For example, the phase transition temperatures of the compound of the general formula (I) wherein $R^1=C_6H_{13}$-, and $R^2=C_8H_{17}$- are $C_r$-26° C.-$S_C$-47° C.-$S_A$-58° C. -N-65° C.-$I_{SO}$ wherein N represents a nematic phase, the compound assumes an $S_C$ phase in a relatively low temperature range while the phase transition temperatures of the compound of the formula (II) wherein $R^3=C_7H_{15}$-, and $R^4=C_8H_{17}$- are $C_r$-58° C.-$S_C$-134° C.-$S_A$-144° C.-N-157° C.-$I_{SO}$, and the compound assumes an $S_C$ phase in a relatively high temperature range. Therefore, if a compound represented by the general formula (I) is combined with a compound represented by the general formula (II), a base $S_C$ mixture having an $S_C$ phase over a wide temperature range from a low temperature range to a high temperature range can be obtained.

Of non-chiral compounds represented by the general formula (I) or (II) that serve as the component A of the present invention, typical compounds assuming an $S_C$ phase etc. are compounds listed in Tables 1 and 2 below.

TABLE 1

Compounds represented by

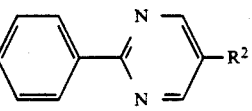

| $R^1$ | $R^2$ | $R^1$ | $R^2$ |
|---|---|---|---|
| $C_6H_{13}$— | $C_6H_{13}$— | $C_9H_{19}$— | $C_7H_{15}$— |
| " | $C_9H_{19}$— | " | $C_8H_{17}$— |
| " | $C_{10}H_{21}$— | " | $C_9H_{19}$— |
| " | $C_{11}H_{23}$— | " | $C_{10}H_{21}$— |
| $C_7H_{15}$— | $C_9H_{19}$— | $C_{10}H_{21}$— | $C_8H_{17}$— |
| " | $C_{10}H_{21}$— | $C_{11}H_{23}$— | $C_7H_{15}$— |
| " | $C_{11}H_{23}$— | " | $C_8H_{17}$— |
| $C_8H_{17}$— | $C_8H_{17}$— | $C_{12}H_{25}$— | $C_7H_{15}$— |
| " | $C_9H_{19}$— | " | $C_8H_{17}$— |
| " | $C_{10}H_{21}$— | | |
| " | $C_{11}H_{23}$— | | |

TABLE 2

Compounds represented by

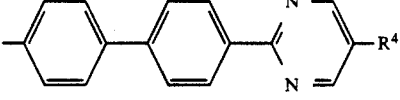

| $R^3$ | $R^4$ | $R^3$ | $R^4$ |
|---|---|---|---|
| $C_4H_9O$— | $C_4H_9$— | $C_6H_{13}O$— | $C_{12}H_{25}$— |
| $C_5H_{11}O$— | $C_4H_9$— | $C_7H_{15}O$— | $C_4H_9$— |
| " | $C_5H_{11}$— | " | $C_5H_{11}$— |
| " | $C_6H_{13}$— | " | $C_6H_{13}$— |
| " | $C_7H_{15}$— | " | $C_7H_{15}$— |
| " | $C_8H_{17}$— | " | $C_8H_{17}$— |
| " | $C_9H_{19}$— | " | $C_9H_{19}$— |
| " | $C_{10}H_{21}$— | " | $C_{10}H_{21}$— |
| " | $C_{12}H_{25}$— | " | $C_{12}H_{25}$— |
| $C_6H_{13}O$— | $C_4H_9$— | $C_8H_{17}O$— | $C_4H_9$— |
| " | $C_5H_{11}$— | " | $C_5H_{11}$— |
| " | $C_6H_{13}$— | " | $C_6H_{13}$— |
| " | $C_7H_{15}$— | " | $C_7H_{15}$— |
| " | $C_8H_{17}$— | " | $C_8H_{17}$— |
| " | $C_9H_{19}$— | " | $C_9H_{19}$— |
| " | $C_{10}H_{21}$— | " | $C_{10}H_{21}$— |
| $C_8H_{17}O$— | $C_{12}H_{25}$— | $C_{12}H_{25}O$— | $C_5H_{11}$— |
| $C_9H_{19}O$— | $C_4H_9$— | " | $C_6H_{13}$— |
| " | $C_5H_{11}$— | " | $C_7H_{15}$— |
| " | $C_6H_{13}$— | " | $C_8H_{17}$— |
| " | $C_7H_{15}$— | " | $C_9H_{18}$— |
| " | $C_8H_{17}$— | " | $C_{10}H_{21}$— |

TABLE 2-continued

Compounds represented by

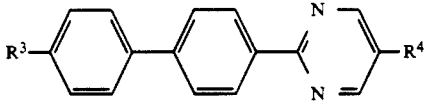

| $R^3$ | $R^4$ | $R^3$ | $R^4$ |
|---|---|---|---|
| " | $C_9H_{19}$— | " | $C_{12}H_{25}$— |
| " | $C_{10}H_{21}$— | $C_{14}H_{29}O$— | $C_4H_9$— |
| " | $C_{12}H_{25}$— | " | $C_5H_{11}$— |
| $C_{10}H_{21}O$— | $C_4H_9$— | " | $C_6H_{13}$— |
| " | $C_5H_{11}$— | " | $C_7H_{15}$— |
| " | $C_6H_{13}$— | " | $C_8H_{17}$— |
| " | $C_7H_{15}$— | " | $C_9H_{19}$— |
| " | $C_8H_{17}$— | " | $C_{10}H_{21}$— |
| " | $C_9H_{19}$— | " | $C_{12}H_{25}$— |
| " | $C_{10}H_{21}$— | | |
| " | $C_{12}H_{25}$— | | |
| $C_{11}H_{23}O$— | $C_4H_9$— | | |
| $C_{12}H_{25}O$— | $C_4H_9$— | | |
| $C_5H_{11}$— | $C_5H_{11}$— | $C_6H_{13}$— | $C_{14}H_{29}$— |
| " | $C_6H_{13}$— | $C_7H_{15}$— | $C_5H_{11}$— |
| " | $C_7H_{15}$— | " | $C_6H_{13}$— |
| " | $C_8H_{17}$— | " | $C_7H_{15}$— |
| " | $C_9H_{19}$— | " | $C_8H_{17}$— |
| " | $C_{10}H_{21}$— | " | $C_9H_{19}$— |
| " | $C_{12}H_{25}$— | " | $C_{10}H_{21}$— |
| " | $C_{14}H_{29}$— | " | $C_{12}H_{25}$— |
| $C_6H_{13}$— | $C_5H_{11}$— | " | $C_{14}H_{29}$— |
| " | $C_6H_{13}$— | $C_8H_{17}$— | $C_5H_{11}$— |
| " | $C_7H_{15}$— | " | $C_6H_{13}$— |
| " | $C_8H_{17}$— | " | $C_7H_{15}$— |
| " | $C_9H_{19}$— | " | $C_8H_{17}$— |
| " | $C_{10}H_{21}$— | " | $C_9H_{19}$— |
| " | $C_{12}H_{25}$— | " | $C_{10}H_{21}$— |
| $C_8H_{17}$— | $C_{12}H_{25}$— | $C_{10}H_{21}$— | $C_{14}H_{29}$— |
| " | $C_{14}H_{29}$— | $C_{12}H_{25}$— | $C_5H_{11}$— |
| $C_9H_{19}$— | $C_5H_{11}$— | " | $C_6H_{13}$— |
| " | $C_6H_{13}$— | " | $C_7H_{15}$— |
| " | $C_7H_{15}$— | " | $C_8H_{17}$— |
| " | $C_8H_{17}$— | " | $C_9H_{19}$— |
| " | $C_9H_{19}$— | " | $C_{10}H_{21}$— |
| " | $C_{10}H_{21}$— | " | $C_{12}H_{25}$— |
| " | $C_{12}H_{25}$— | " | $C_{14}H_{29}$— |
| " | $C_{14}H_{29}$— | $C_{14}H_{29}$— | $C_5H_{11}$— |
| $C_{10}H_{21}$— | $C_5H_{11}$— | " | $C_6H_{13}$— |
| " | $C_6H_{13}$— | " | $C_7H_{15}$— |
| " | $C_7H_{15}$— | " | $C_8H_{17}$— |
| " | $C_8H_{17}$— | " | $C_9H_{19}$— |
| " | $C_9H_{19}$— | " | $C_{10}H_{21}$— |
| " | $C_{10}H_{21}$— | " | $C_{12}H_{25}$— |
| " | $C_{12}H_{25}$— | " | $C_{14}H_{29}$— |

As non-chiral compounds represented by the general formula (I) or (II) used as a component of the present ferroelectric liquid crystal composition, ones having an $S_C$ phase are preferable although compounds not assuming an $S_C$ phase can be used if the compounds are intended to be components that are used in amounts in the ranges where the compounds will not make extremely narrow the $S_C^*$ phase temperature range of the resulting ferroelectric liquid crystal composition, and that lower the viscosity or adjust the $S_C^*$ phase temperature range.

The compounds represented by the general formula (III) that serve as the component B are chiral compounds disclosed in Japanese Patent Laid-Open Publication No. 219251/1984 filed by the present applicants, are not large in spontaneous polarization, do not assume an $S_A$ phase, have an $S_C^*$ phase in a very high temperature range, and exhibit a cholesteric phase in a very wide temperature range (for example, $C_r$-81° C.-$S_C^*$-131° C.-N*-175° C.-$I_{SO}$ in the case of $R^5=C_8H_{17}O$-). Therefore, the compounds represented by the general formula (III) that serve as the component B play a very important role for the exhibition of the $I_{SO} \rightarrow N^* \rightarrow S^*$ type phase transition in the composition intended by the invention.

As compounds represented by the formula (III) which constitute component B in the present invention, the following compounds are typical compounds.

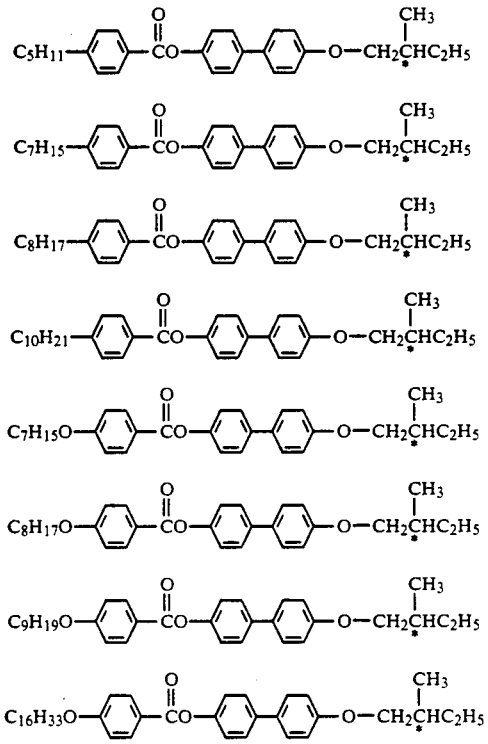

The compounds represented by the formula (IV) that serve as the component C are chiral compounds whose patent applications were filed by the present applicant and were laid open (for example see Japanese Patent Laid-Open Publication Nos. 43/1986, and 210056/1986), many of them exhibit an $I_{SO} \rightarrow N^* \rightarrow SC^*$ type phase transition like the compounds represented by the formula (III) that serve as the component B, and since they assume an $N^*$ phase and an $S_C^*$ phase in a high temperature range, they play an important role for the exhibition of an $ISO \rightarrow N^* \rightarrow S_C^*$ type phase transition in the ferroelectric liquid crystal composition intended by the the present invention.

Further, as a rule, among the response time ($\tau$), the spontaneous polarization value ($P_S$), and the viscosity ($\eta$) of a ferroelectric liquid crystal material, there is the following relationship:

$$\tau = \frac{\eta}{P_S \cdot E}$$

wherein E represents the electric field intensity, and therefore such a compound that it has a low viscosity, and a large spontaneous polarization value is desired. Since the compounds represented by the formula (IV) and constituting the component C have high spontaneous polarization values ($\approx 100$ nC/cm$^2$), they play an important role for the exhibition of an $I_{SO} \rightarrow N^* \rightarrow S_C^*$ type phase transition and a quick response time in the ferroelectric liquid crystal composition intended by the present invention.

For example, the phase transition temperatures of the compound represented by the formula (IV) wherein $R^6 = C_6H_{13}O-$,

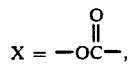

and Y=-H are $C_r$-71° C.-$S_C^*$-98° C.-$N^*$-123° C.-$I_{SO}$, and the spontaneous polarization value is 110 nC/cm$^2$ (T-$T_C$=-30° C).

Further, the phase transition temperatures of the compound wherein $R^6 = C_8H_{17}O-$,

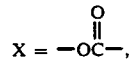

and Y=-F are $C_r$-52° C.-$S_C^*$-104° C.-$N^*$-109° C.-$I_{SO}$, and the spontaneous polarization value is 132 nC/cm$^2$ (T-$T_C$=-30° C).

Even the compounds represented by the formula (IV) that have an $S_A$ phase can be used as a component that will be incorporated to cause a quick response property and will be exhibited so long as its amount is in the range where it will not adversely affect the phase transition series ($I_{SO} \rightarrow N^* \rightarrow S_C^*$ type) of the ferroelectric liquid crystal composition intended by the present invention.

As the compounds represented by the formula (IV) that serve as the component C of the present invention, typically the following compounds can be mentioned:

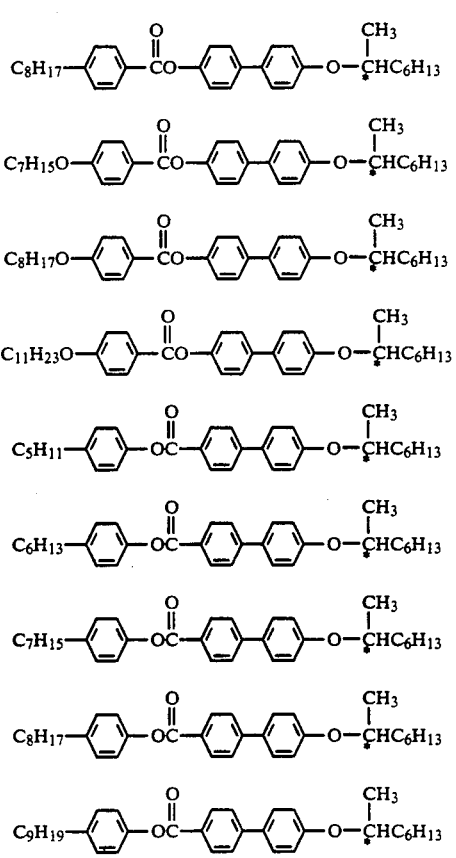

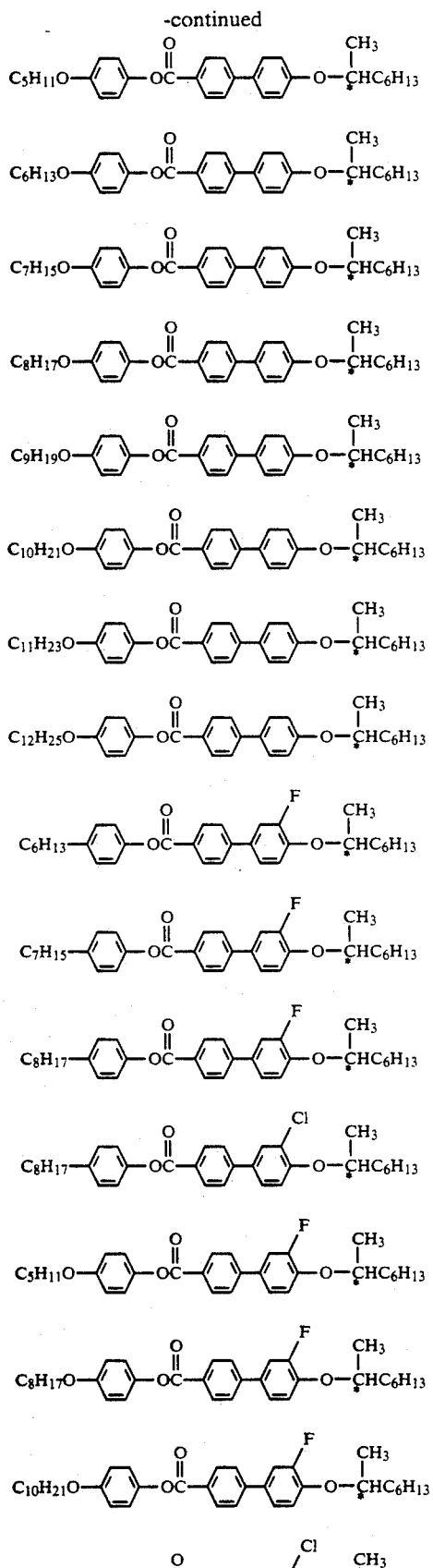

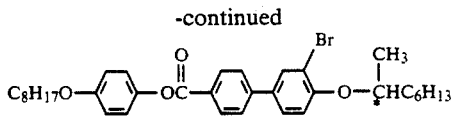

The compounds represented by the formula (V) that serve as the component D are chiral compounds whose patent application was filed by the present applicant and was laid open (see Japanese Patent Laid-Open Publication No. 169765/1987) have low viscosities, the temperature range of the $S_C^*$ phase extending to very low temperatures, and they play a role for lowering the lower limit of the $S_C$ phase in the ferroelectric liquid crystal composition intended by the present invention. For example, the phase transition temperatures of the compound represented by the general formula (V) wherein $R^7 = C_8H_{17}$-, $Z = $-F, and $n = 5$ are $C_r$-10° C.-$S_C^*$-33° C. -$S_A$-43° C.-$I_{SO}$, and the phase transition temperatures of the compound represented by the general formula (V) wherein $R^7 = C_9H_{18}$-, $Z = $-H, and $n = 4$ are $C_r$-10° C.-$S_C^*$-47° C.-$S_A$-59° C.-$I_{SO}$.

As the compounds represented by the formula (V) that serve as the component D, typically the following compounds can be exemplified:

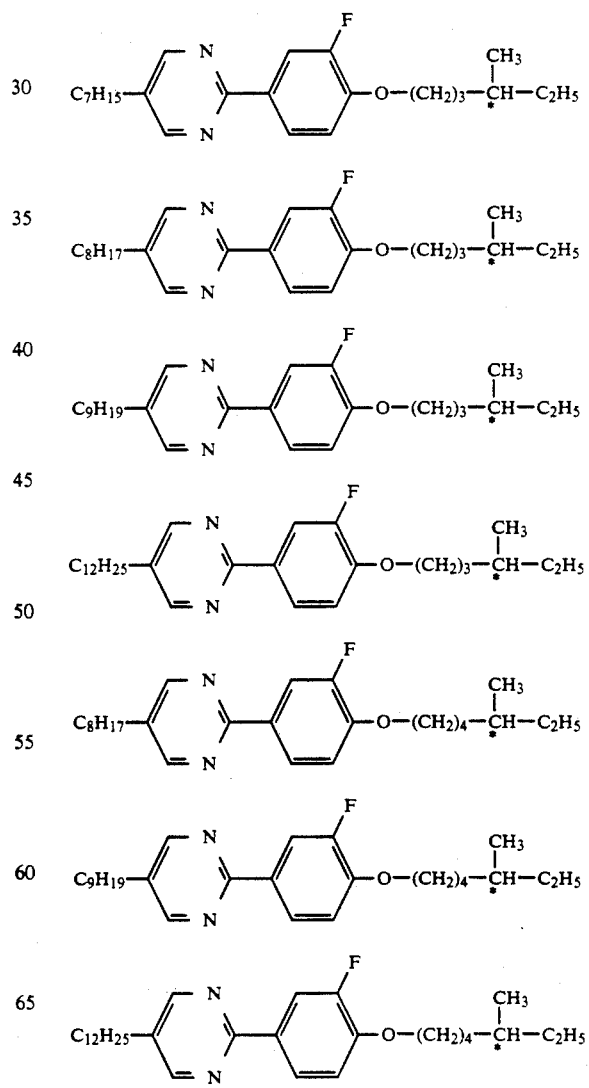

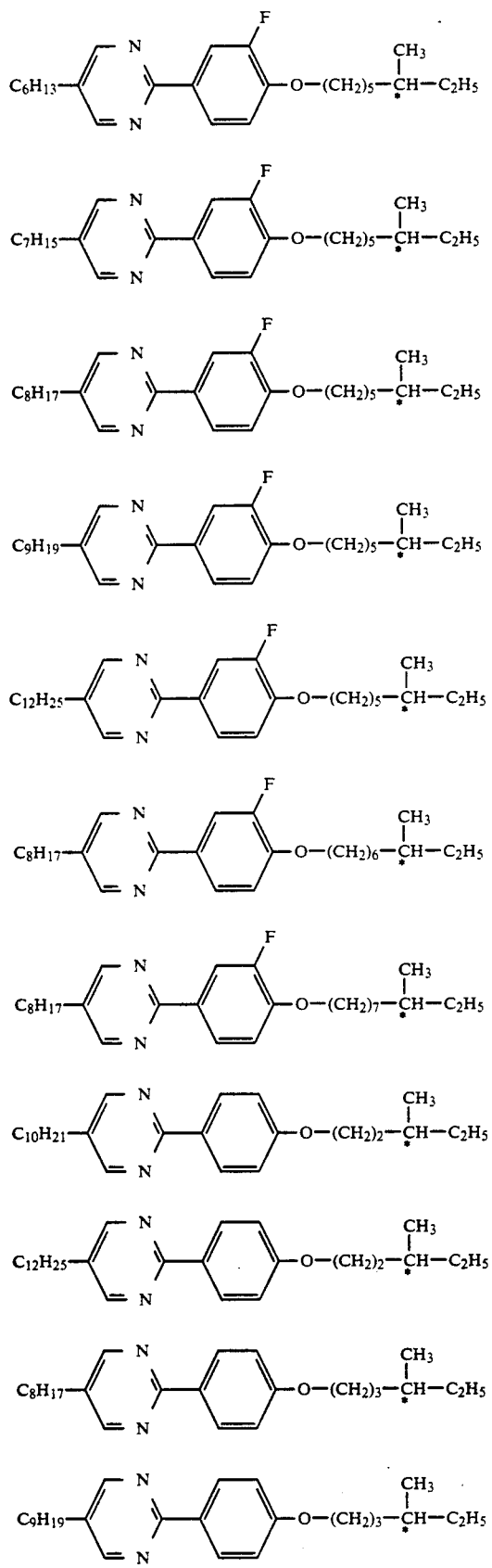
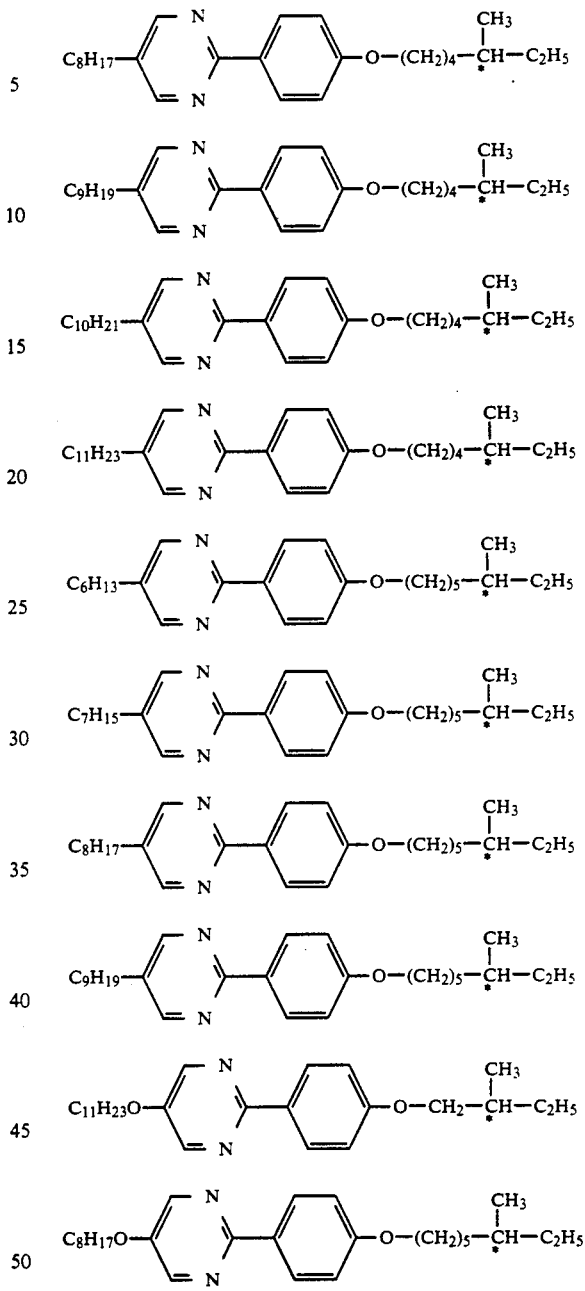

Although the present invention can be attained by combining the above components A, B, C, and D, when the component E, given below, is further incorporated, a very practical ferroelectric liquid crystal composition that is improved in its response property can be provided.

The compounds represented by the general formula (VI) and that serves as the component E are chiral compounds whose patent application was filed (see Japanese Patent Laid-Open Publication No. 103,977/1987) exhibit an $I_{SO} \rightarrow N^* \rightarrow S_C^*$ type phase transition like the compounds represented by the general formula (III) that are the component B, and the $N^*$ phase and the $S_C^*$ phase have high temperature ranges. Further, since the spontaneous polarization thereof is very large ($\simeq 300$ nCcm$^{-2}$), in the ferroelectric composition intended by the invention, they exhibit an $I_{SO} \rightarrow N^* \rightarrow S_C^*$ type phase transition and at the same time play an important role for exhibiting quick response property ( for example in the case of $R^8 = C_6H_{13}O$-, and $R^9 = -OC_4H_9$, the phase transition temperatures are $C_r$-88° C.-$S_C^*$-104° C.-$N^*$-113° C.-$I_{SO}$, and the spontaneous polarization value is 378 nC.cm$^{-2}$(T-$T_C$= −10° C.)).

It is preferable to use, as the compounds represented by the formula (VI), compounds having the $S_C^*$ phase, which compounds represented by the formula (VI) are compatible with the compounds represented by the formula (I) or (II) that serve as the component A, and even if they don't have the $S_C^*$ phase, when they are mixed with the component A, the $S_C^*$ phase and the $N^*$ phase are exhibited over a wider temperature range.

Consequently, even compounds that do not exhibit the $S_C^*$ phase can be used in the ferroelectric liquid crystal composition intended by the present invention. Typical compounds of the compounds represented by the formula (VI) that serve as the component E are the following

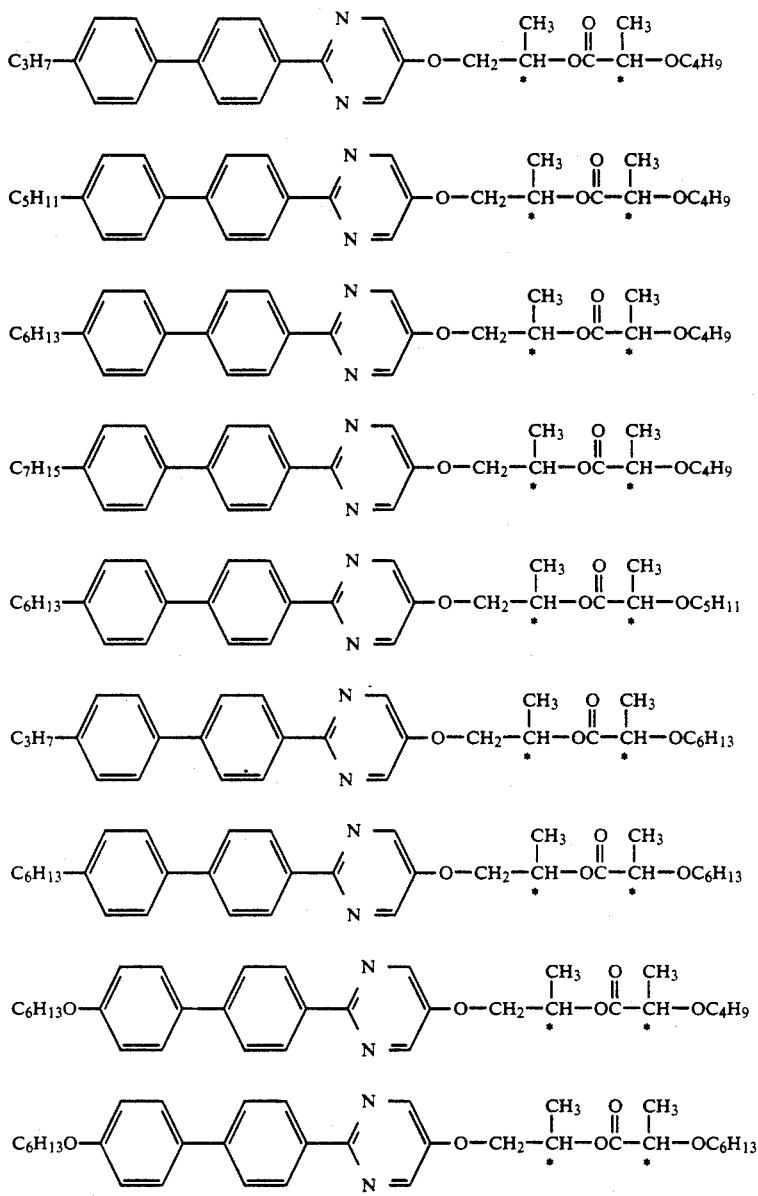

In order to provide liquid crystal compositions having intended properties with the best use of the properties of the components A, B, C, D, and E being made, the proportions of the components A, B, C, D, and E have been studied in various ways, and as stated before, it has been found the proportions are suitably such that the component A is used in an amount of 20 to 80 wt. %, the component B is used in an amount of 5 to 30 wt. %, the component C is used in an amount of 3 to 10 wt. %, the component D is used in an amount of 3 to 20 wt. %, and the amount of the component E is 3 to 10 wt. %, based on the total of the amounts of the components A, B, C, and D, leading to the completion of the present invention.

When the amounts of the components A, B, C, D, and E used are less than the lower limits, the effect of the blending of the components A, B, C, D, and E is not enough.

As for the component A, although it is very low in viscosity, and is useful as the base $S_m$ mixture, if the amount of the component A exceeds 80 wt. % of the composition, the amounts of the chiral compounds become lowered relatively, the spontaneous polarization decreases, and the response time is adversely affected.

As for the component B, although it exhibits the cholesteric phase over a very wide range, if the amount thereof exceeds 30 wt. % of the composition, the viscosity of the composition becomes high, and the response time is adversely affected.

As for the component C, many of the compounds serving as the component C exhibit the $I_{SO} \rightarrow N^* \rightarrow S_C^*$ phase transition, some of them have the $S_A$ phase, and since the component C increases the viscosity of the composition, and adversely affects the response time, the upper limit of the proportion of the component C is 10 wt. %.

As for the component D, although the component C is low in viscosity and the temperature range of the $S_C$ phase of the component D extends to a lower temperature, since the component D has an $S_A$ phase, the proportion of the component D is up to 20 wt. %.

As for the component E, although the component E exhibits the $N^*$ phase and the $S_C^*$ phase in high temperature ranges, and the spontaneous polarization is very large, if the amount of the component E exceeds 10 wt. %, based on the total amount of the components A, B, C, and D, the viscosity of the composition becomes high, and the response time is adversely affected, so that the upper limit of the amount of the component E is 10 wt. %.

When the present liquid crystal composition is used as a basic composition, a ferroelectric liquid crystal material free from any zigzag defect, exhibiting good orientation characteristics, and having quick response can be obtained, and when the liquid crystal material is used, a liquid crystal element fairly good in contrast, good in memory properties, and high in response speed can be provided.

As unique applications of the present ferroelectric liquid crystal composition, can be mentioned, for example, high-speed liquid crystal shutters, and high-definition liquid crystal displays.

EXAMPLES

Now the present invention will be described in more detail with reference to the following examples, but the present invention is not limited by the examples.

Various measurements in the present invention were carried out by the methods shown below.

The value of spontaneous polarization ($P_S$) was measured by the Sawyer-Tower method, and the tilt angle ($\theta$) was determined by first applying an electric field sufficiently higher than the critical field to the cell which had been subjected to homogeneous alignment, extinguishing the helical structure, reversing the polarity, and measuring the mobile angle (corresponding to $2\theta$) of the extinction position under crossed nicols.

The response time was determined by putting each composition in the cell having an electrode interval of 2 μm which had been subjected to an alignment treatment, and measuring the change in intensity of transmitted light at the time when rectangular waves having $V_{pp}$ of 20 V and 1 KHz were applied.

The $S_C^*$ pitch was determined by directly measuring each interval between striped lines (dechiralization lines) corresponding to the helical pitch under a polarizing microscope by the use of a cell having a thickness of about 200 μm which had been subjected to homogeneous treatment.

The $N^*$ pitch was indirectly determined by measuring the interval (l) between the line defects (disclination lines) under a polarizing microscope by the use of a wedge type cell, based on the theoretical relationship: P (pitch) $=2l \tan \theta$ wherein $\theta$ represents the tilt angle of the wedge type cell.

Although, in some of the examples, the composition contained, in addition to the compounds represented by the formulae (I) to (VI), other compounds for extending the pitch of the $N^*$ phase or the $S_C^*$ phase, the incorporation of these compounds brings about no problem because they would not impair the properties of the ferroelectric liquid crystal composition intended by the present invention.

EXAMPLE 1

Compounds represented by the formula (I) to (V) were used to prepare a ferroelectric liquid crystal composition having the following formulation:

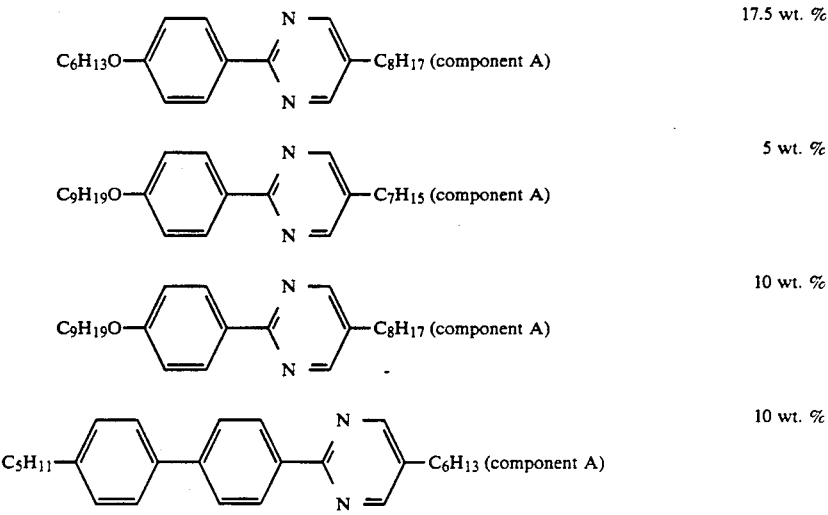

-continued

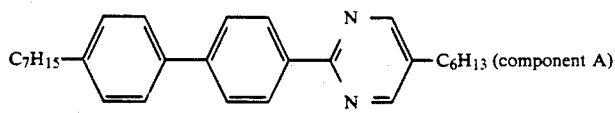
7.5 wt. %

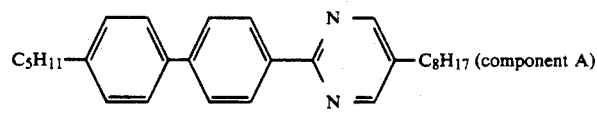
5 wt. %

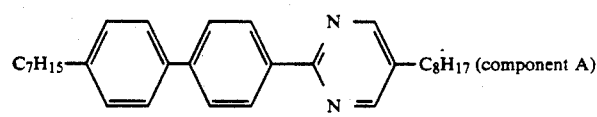
5 wt. %

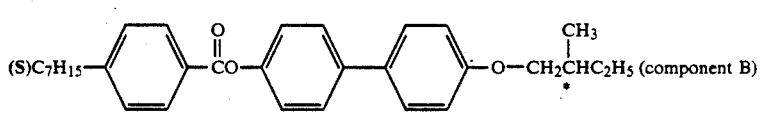
15 wt. %

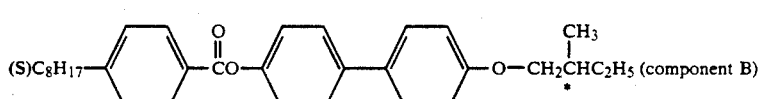
7.5 wt. %

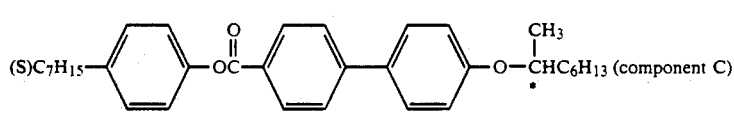
5 wt. %

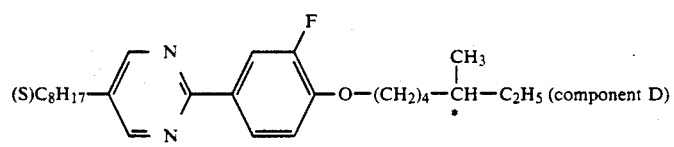
5 wt. %

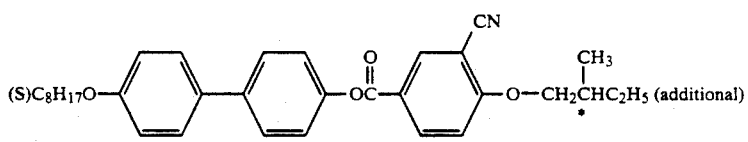
7.5 wt. %

The above ferroelectric liquid crystal composition shown the following phase transition temperatures:

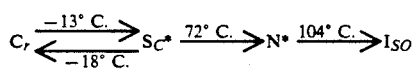

At 25 ° C., the $P_S$ was 5 nC.cm$^{-2}$, the tilt angle was 35°, and the response time was 660 μsec. The pitch of the N* phase was 18 μm at 73 ° C., and the pitch of the $S_C$* phase was 6 μm at 25 ° C.

The orientation characteristics were very good, and when the composition was poured in a cell that had been subjected to SiO oblique deposition, and had a cell thickness of 2 μm, and transparent electrodes, uniform orientation free from any defect were obtained, and a liquid crystal element having very good contrast (not less than 1 : 20) was obtained.

As apparent from the above, it was found that by combining compounds represented by the formulae (I) to (V) according to the invention, a ferroelectric liquid crystal composition exhibiting the $S_C$* phase over a wide temperature range including room temperature, and an $I_{SO}$→N* →$S_C$ type phase transition series, and having quick response property can be obtained.

EXAMPLE 2

Compounds represented by the formulae (I) to (VI) were used to prepare a ferroelectric liquid crystal composition having the following formulation:

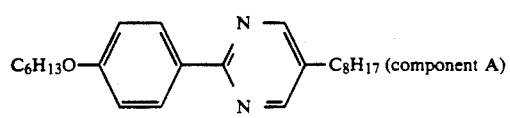
21 wt. %

-continued

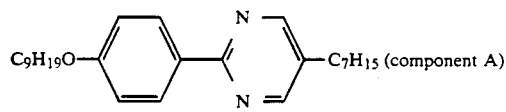 6 wt. %

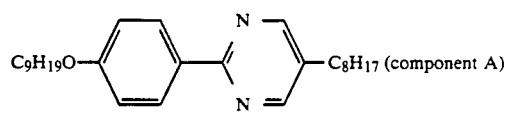 12 wt. %

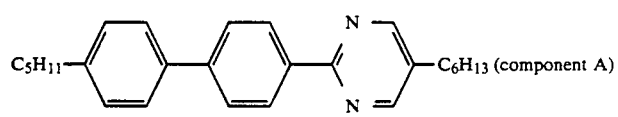 12 wt. %

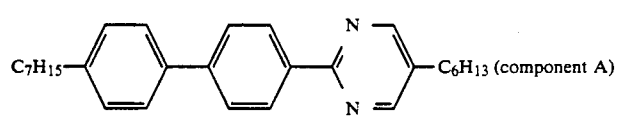 9 wt. %

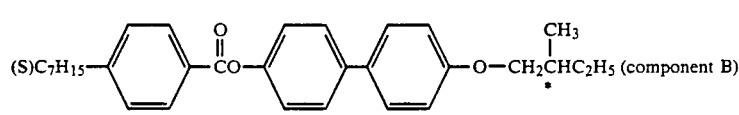 10 wt. %

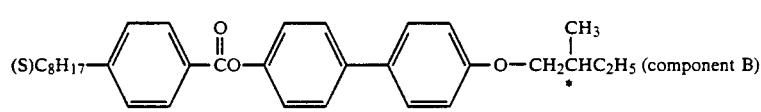 5 wt. %

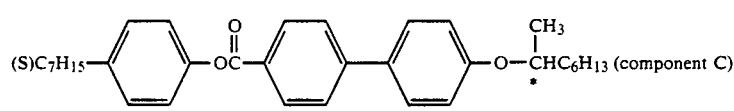 5 wt. %

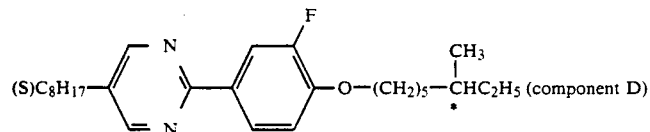 5 wt. %

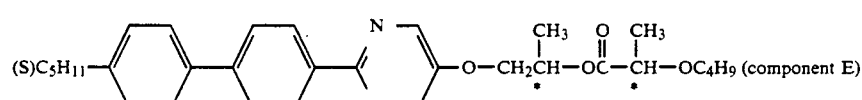 5 wt. %

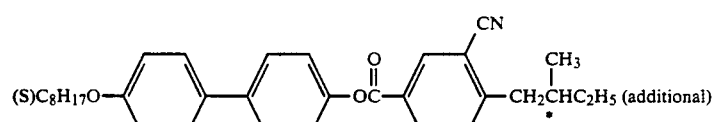 10 wt. %

The above ferroelectric liquid crystal composition showed the following phase transition temperatures:

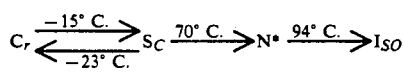

The $P_S$ was 17 nC.cm$^{-2}$ at 25 °C., the tilt angle was 32°, and the response time was 190 μsec. Further, the helical pitch of the N* phase was 32 μm at 71 °C., and the pitch of the $S_C$* phase was 10 μm at 25° C.

The orientation characteristics were very good, and when the composition was poured in a cell that had a cell thickness of 2 μm, and transparent electrodes like the cell used in Example 1, uniform orientation free from any defect were obtained, and a liquid crystal element with very good contrast (not less than 1 : 20) was obtained.

As apparent from the above, it was found that by adding a compound represented by the formula (VI) that had served as the component E to a combination of compounds represented by the formulae (I) to (V) that had served as the components A, B, C, and D according to the invention, a ferroelectric liquid crystal composition exhibiting an $I_{SO}$→N*→$S_C$* type phase transition series, and improved further in response time thereby having high speed response could have been obtained.

EXAMPLE 3 TO 9

In the same way as in Example 1 or 2, ferroelectric liquid crystal compositions having the formulations as shown in Table 3 (wherein (S) indicates the absolute position or configuration was prepared and assessed. The properties of the liquid crystal compositions obtained in Examples 3 to 9 are shown in Table 4.

TABLE 3

| Structural formula | 3 | 4 | 5 | 6 | 7 | 8 | 9 |
|---|---|---|---|---|---|---|---|
| Component A: formula (I) | | | | | | | |
| $C_9H_{19}O-\text{Ph}-\text{Pyrimidine}-C_7H_{15}$ | 6 | 6.5 | 5 | 6 | 5 | 5 | 5 |
| $C_6H_{13}O-\text{Ph}-\text{Pyrimidine}-C_8H_{17}$ | | 22.75 | 17.5 | 21 | 17.5 | 17.5 | 17.5 |
| $C_9H_{19}O-\text{Ph}-\text{Pyrimidine}-C_8H_{17}$ | 21 | | | | | | |
| | 12 | 13 | 10 | 12 | 10 | 10 | 10 |
| Component A: formula (III) | | | | | | | |
| $C_5H_{11}-\text{Ph}-\text{Ph}-\text{Pyrimidine}-C_6H_{13}$ | 12 | 13 | 20 | 12 | 20 | 15 | 15 |
| $C_7H_{15}-\text{Ph}-\text{Ph}-\text{Pyrimidine}-C_6H_{13}$ | 9 | 9.75 | 7.5 | 9 | 7.5 | 12.5 | 12.5 |
| Component B: formula (III) | | | | | | | |
| $C_7H_{15}-\text{Ph}-\text{Ph}-COO-\text{Ph}-OCH_2-\overset{*}{CH}(CH_3)-C_2H_5$ (S) | 10 | 10 | 15 | 10 | 15 | 15 | 10 |
| $C_8H_{17}-\text{Ph}-\text{Ph}-COO-\text{Ph}-OCH_2-\overset{*}{CH}(CH_3)-C_2H_5$ (S) | 15 | 10 | 5 | 10 | 5 | 10 | 5 |
| Component C: formula (IV) | | | | | | | |
| $C_6H_{13}-\text{Ph}-COO-\text{Ph}-\text{Ph}(F)-O\overset{*}{CH}(CH_3)-C_6H_{13}$ (S) | 5 | 5 | 5 | 5 | | | |

TABLE 3-continued

| | Structural formula | Example No. (wt. %) | | | | | | | |
|---|---|---|---|---|---|---|---|---|---|
| | | 3 | 4 | 5 | 6 | 7 | 8 | 9 | |
| Component D: formula (V) | C7H15—⌬—⌬—OC(=O)—⌬—OCH(CH3)—C6H13 (S) | 5 | | 10 | 5 | 5 | 5 | 5 | |
| | C8H17—[pyrimidine]—⌬(F)—O(CH2)4—CH(CH3)—C2H5 (S) | | 10 | 10 | | | | | |
| | C8H17—[pyrimidine]—⌬(F)—O(CH2)5—CH(CH3)—C2H5 (S) | 5 | | 5 | | 5 | | | |
| Component E: formula (VI) | C5H11—⌬—⌬—[pyrimidine]—OCH2—CH(CH3)—OC(=O)—CH(OCH3)—OC4H9 (S,S) | | | | | | | 5 | |
| Additional component | C8H19O—⌬—⌬—OC(=O)—⌬(CN)—CH2—CH(CH3)—C2H5 (S) | | | | | 10 | 10 | | 10 |

TABLE 4

|  | Example No. | | | | | | |
|---|---|---|---|---|---|---|---|
|  | 3 | 4 | 5 | 6 | 7 | 8 | 9 |
| Phase transition temperature (°C.) | | | | | | | |
| $C_r \rightarrow S_C^*$ | −10 | −12 | −9 | −12 | −13 | −12 | −10 |
| $S_C^* \rightarrow N^*$ | 64 | 63 | 67 | 72 | 74 | 70 | 72 |
| $N^* \rightarrow I_{SO}$ | 92 | 92 | 94 | 95 | 104 | 105 | 100 |
| Spontaneous polarization value** (nC · cm$^{-2}$) | 2 | 2 | 3 | 3 | 3 | 3 | 17 |
| Tilt angle** (°) | 31 | 30 | 31 | 31 | 32 | 30 | 32 |
| Response time** (μsec) | 800 | 750 | 760 | 750 | 770 | 800 | 190 |
| Helical pitch** (μm) | 4 | 4 | 4 | 3 | 6 | 6 | 11 |

**value at 25° C.

What is claimed is:

1. A ferroelectric liquid crystal composition having quick response property comprising at least each of:
a component A of one or more compounds selected from the group consisting of compounds of the formula (I):

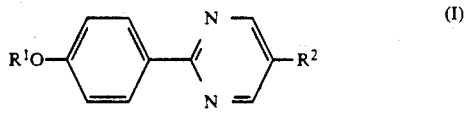

wherein R$^1$ and R$^2$, which may be the same or different, each represents an alkyl group having 1 to 18 carbon atoms; and compounds of the formula (II):

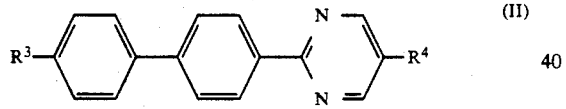

wherein R$^3$ and R$^4$, which may be the same or different, each represents an alkyl group or an alkoxy group having 1 to 18 carbon atoms;
component B being a compound expressed by formula (III):

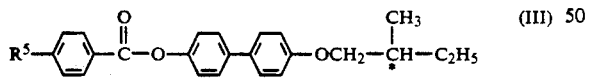

wherein R$^5$ represents an alkyl group or alkoxy group each having 1 to 18 carbon atoms, and * indicates an asymmetric carbon atom;
component C being a compound expressed by the formula (IV):

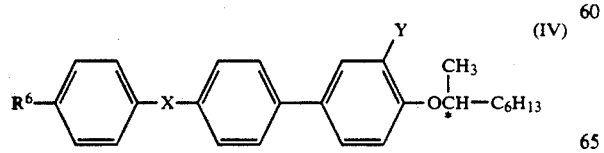

wherein R$^6$ represents an alkyl group or alkoxy group each having 1 to 18 carbon atoms, X represents

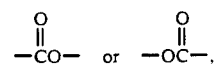

Y represents a hydrogen atom or a halogen atom, and * indicates an asymmetric carbon atom; and
component D being a compound expressed by the formula (V):

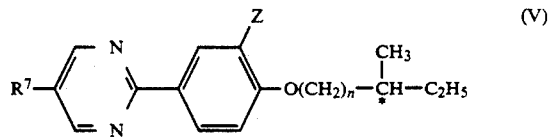

wherein R$^7$ represents an alkyl group or alkoxy group each having 1 to 18 carbon atoms, n is an integer of 0 to 10, Z represents a hydrogen atom or a halogen atom, and * indicates an asymmetric carbon atom and the proportion of said component A being 20 to 80 wt. %, that of said component B being 5 to 30 wt. %, that of said component C being 3 to 10 wt. %, that of said component D being 3 to 20 wt. %, based on the total amount of said four components A, B, C and D, and the phase transition series of said composition assumes an order of isotropic liquid→ cholesteric phase→chiral smectic C phase, starting from the high temperature side.

2. The ferroelectric liquid crystal composition as claimed in claim 1, wherein said component A is at least one compound selected from the group consisting of:

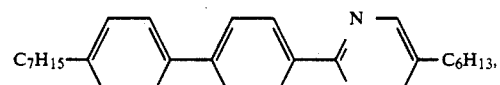

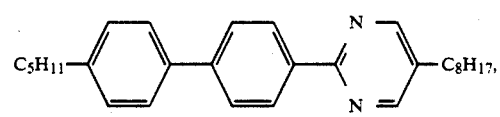

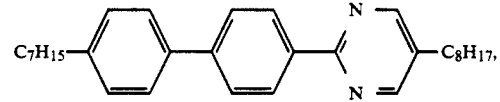

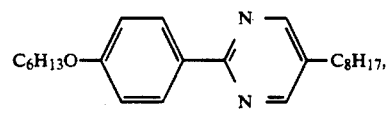

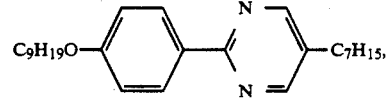

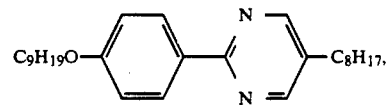

and

-continued

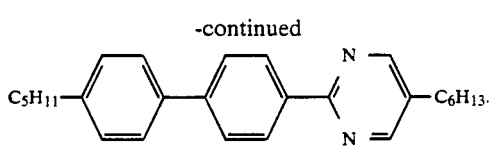

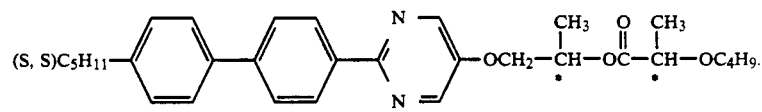

$R^2$ are 6 to 12, that of $R^3$ and $R^4$ are 4 to 14, that or $R^5$ are 5 to 16, that of $R^6$ are 5 to 12, that of $R^7$ are 6 to 12.

8. An optical switching element, using the ferroelectric liquid crystal composition as claimed in claim 1.

9. The ferroelectric liquid crystal composition as claimed in claim 12, wherein the component E is 3. The ferroelectric liquid crystal composition as claimed in claim 1, wherein said component B is at least one compound selected from the group consisting of:

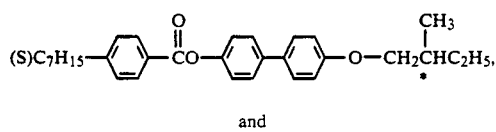

and

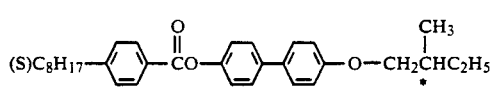

4. The ferroelectric liquid crystal composition as claimed in claim 1, wherein said component C is at least one compound selected form the group consisting of:

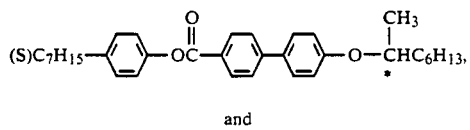

and

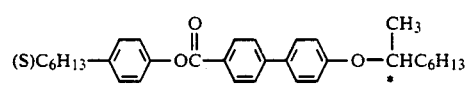

5. The ferroelectric liquid crystal composition as claimed in claim 1, wherein said component D is at least one compound selected from the group consisting of:

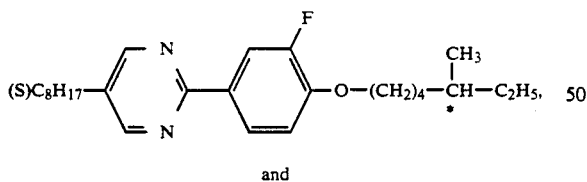

and

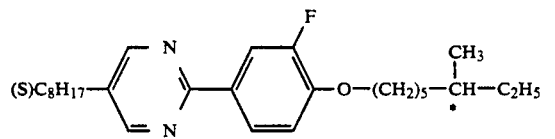

6. The ferroelectric liquid crystal composition as claimed in claim 1, wherein the proportion of said component A being 50 to 75 wt. %, that of the component B being 10 to 30 wt. %, that of the component C being 3 to 7 wt. % and that of the component D being 3 to 20 wt. %.

7. The ferroelectric liquid crystal composition as claimed in claim 1, wherein the carbon atoms of $R^1$ and 10. The ferroelectric liquid crystal composition as claimed in claim 12 wherein the carbon atoms of $R^8$ are 3 to 7, that of $R^9$ are 4 to 6.

11. An optical switching element, using the ferroelectric liquid crystal composition as claimed in claim 12.

12. A ferroelectric liquid crystal composition having a quick response property comprising at least each of:
a component A of one or more compounds selected from the group consisting of compounds of the formula (I):

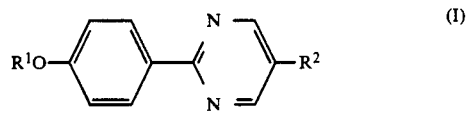

wherein $R^1$ and $R^2$, which may be the same or different, each represents an alkyl group having 1 to 18 carbon atoms; and compounds of the formula (II):

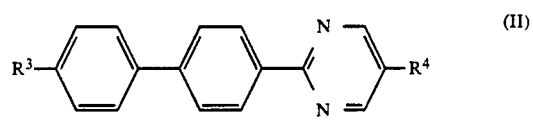

wherein $R^3$ and $R^4$, which may be the same or different, each represents an alkyl group or an alkoxy group having 1 to 18 carbon atoms;
a component B being a compound expressed by formula (III):

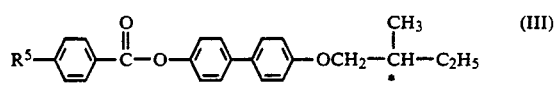

wherein $R^5$ represents an alkyl group or alkoxy group each having 1 to 18 carbon atoms, and * indicates an asymmetric carbon atom;
a component C being a compound expressed by the formula (IV):

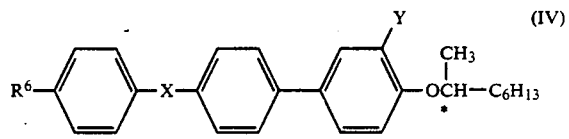

wherein $R^6$ represents an alkyl group or alkoxy group each having 1 to 18 carbon atoms, X represents

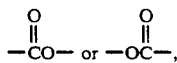

Y represents a hydrogen atom or a halogen atom, and * indicates an asymmetric carbon atom;
a component D being a compound expressed by the formula (V):

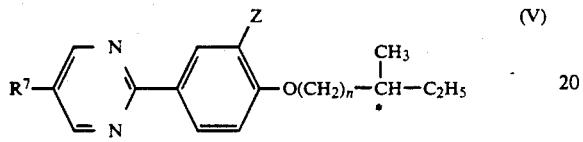

wherein $R^7$ represents an alkyl group or alkoxy group each having 1 to 18 carbon atoms, n is an integer of 0 to 10, Z represents a hydrogen atom or a halogen atom, and * indicates an asymmetric carbon atoms; and a component E being a compound expressed by the formula (VI):

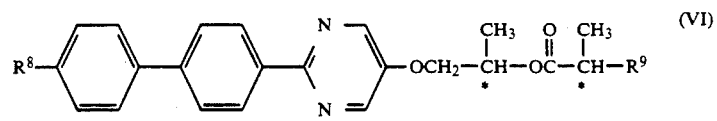

wherein $R^8$ represents an alkyl group or alkoxy group having 1 to 18 carbon atoms, $R^9$ represents an alkyl group having 2 to 18 carbon atoms or an alkoxy group having 1 to 18 carbon atoms, and * indicates an asymmetric carbon atom, the proportion of said component A being 20 to 80 wt. %, that of said component B being 5 to 30 w. %, that of said component C being 3 to 10 wt. %, that of said component D being 3 to 20 wt. %, and that of component E being 3 to 10 wt. %, based on the total amount of said four component A, B, C and D, and the phase transition series of said composition assumes an order of isotropic liquid→cholesteric phase→chiral smetic C phase, starting from the high temperature side.

* * * * *